(No Model.)

C. REMINGTON.
ANIMAL TROUGH.

No. 292,853. Patented Feb. 5, 1884.

WITNESSES:
Fred G. Dieterich
Walter S. Dodge

INVENTOR,
C. Remington
by Dodge & Son,
ATTORNEYS.

N. PETERS, Photo-Lithographer, Washington, D. C.

UNITED STATES PATENT OFFICE.

CARVER REMINGTON, OF ILION, NEW YORK.

ANIMAL-TROUGH.

SPECIFICATION forming part of Letters Patent No. 292,853, dated February 5, 1884.

Application filed June 21, 1883. (No model.)

*To all whom it may concern:*

Be it known that I, CARVER REMINGTON, of Ilion, in the county of Herkimer and State of New York, have invented certain Improvements in Animal-Troughs, of which the following is a specification.

My invention relates to a novel arrangement of a trough for watering and feeding animals, the details of which will be readily understood by the following description.

Figure 1:
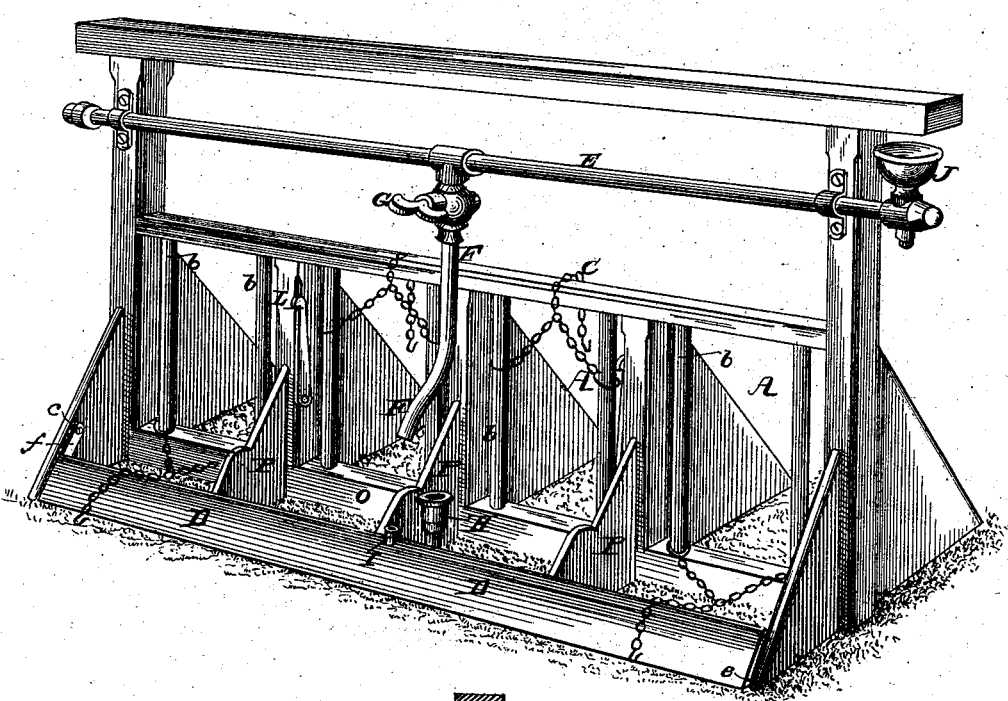
Figure 2:
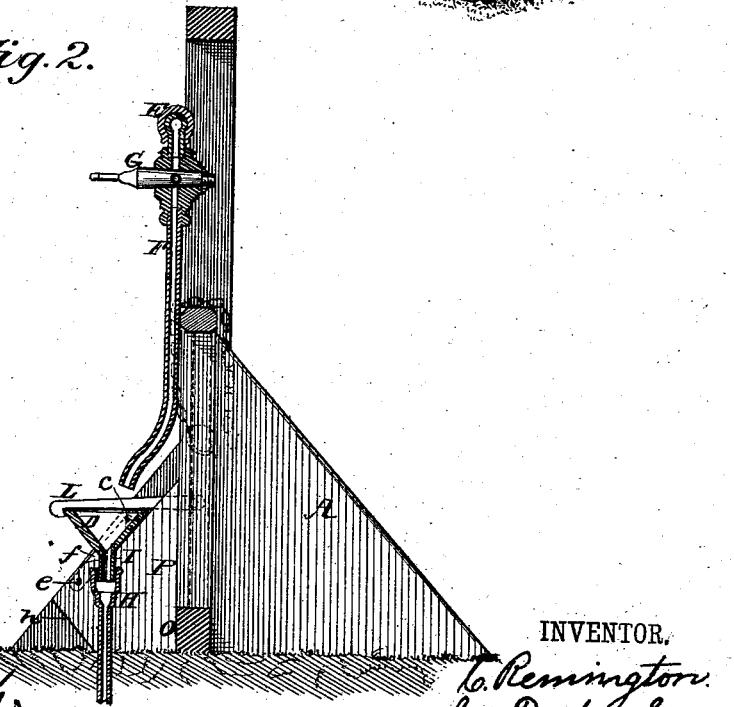

Figure 1 is a perspective view of a series of cattle-stalls with my improvements applied thereto, the trough being shown turned down to form a manger; and Fig. 2 is a transverse section, showing the trough turned up, as it is when used for watering the stock.

When cattle are kept in stalls, it is customary to release them and turn them out to drink, or, if that be not done, to carry the water to them in buckets, which is a laborious and tedious operation, especially where large numbers of cattle are thus kept in stalls. To obviate this is the object of my invention, and to accomplish this result I proceed as follows:

In the accompanying drawings, A represents the stalls, in which the cattle are secured by chains C, which slide freely up and down on the stanchions $b\ b$ in the ordinary manner. Along the front of these stalls extends a timber or plank, O, which forms the rear side of the manger in front of the stalls for holding the hay or other food, the cattle being free to extend their heads from the front of the stalls over into this manger. Across this manger extends a series of partitions, P, corresponding with the partitions between the stalls, as shown in Fig. 1, and these partitions P are notched on their upper inclined edges, as shown, thus forming on them a series of shoulders to receive and support the water-trough D when the latter is turned up, as hereinafter described, and as shown in Fig. 2. I then provide a trough, D, of a length corresponding to the manger, and which may be of a length to correspond with any required number of stalls, (more or less,) as desired, which trough is connected by links $f$ at each end to the end partitions or walls of the manger, as shown in Figs. 1 and 2, these links $f$ being pivoted at one end to the end walls of the manger, as indicated at $e$, and at their opposite ends to the ends of the trough, as indicated at $c$, they being of such a length and so located as to permit the trough to be swung down and turned over on the floor, as shown in Fig. 1, where it will form the outer wall of the manger, the lower outer portion of the partitions P being cut away, as shown at $h$, Fig. 2, so as to permit the beveled side of the trough, when thus turned down, to fit snugly against the inwardly inclined or beveled edges of the partitions, the trough D being shown thus turned down in Fig. 1. When the trough is thus turned down, it will be observed that it not only forms the outer wall of the manger, but that its open side lies flat upon the floor, thereby preventing it from becoming filled with hay or litter of any kind, as it would if it were permitted to remain right side up. The height of the shoulders on the partitions P is made to correspond with the length of the links $f$, and their location so that when the trough D is swung over upward, as shown in Fig. 2, it will rest upon and be supported by these shoulders. A latch, L, or similar device is arranged to engage with the trough D when thus turned up, as shown in Fig. 2, and hold it securely in place until released and turned down by the attendant. In order to supply this trough with water, a supply-pipe, E, is run from any suitable point, and is provided with a delivery-pipe, F, for each separate trough, each of these delivery-pipes being provided with a stop-cock, G, for regulating the supply at will. If the stalls be arranged in a basement and the water is to be supplied from the floor above, the main pipe E may be arranged over the stalls, as shown in Fig. 1, and be provided with a large funnel or hopper, J, into which the water may be delivered, according to circumstances or the means of supplying it. If, however, there be a system of water-works near by, with which the supply-pipe E can be connected, then it will be arranged to run underground, so as to prevent freezing, and in which case the delivery-pipes F will be brought up from below, and so curved or bent as to properly deliver the water into the trough. Each trough D is also provided with a drain-spout or short pipe, I, as shown in Figs. 1 and 2, which is so located that when the trough is turned up, as shown in Fig. 2, its lower end will enter the open mouth of a drain-pipe, H, which passes off underground, so as to convey away any water which may be left in the trough D after the cattle have been supplied, thus preventing the surplus water from being thrown out upon the floor, where it would be liable to form ice or keep the floor wet. It will of course be understood that the drain-pipe I will be provided with a plug or other means for closing it when the trough is to be filled with water, and that the drain-pipe H will also be provided with a lid or cover for closing it when the trough is turned down, so as to prevent it from becoming clogged with hay or other material.

The apparatus thus constructed and arranged answers admirably the purposes for which it is designed, and saves much time and labor, and a series of stalls thus fitted up enables any given number of cattle to be taken care of with less help, and consequently at less cost, than by the plans ordinarily used. It enables the trough to be kept free from litter, thus enabling the water to be delivered to the cattle clear and clean; and it prevents the spilling or slopping of the water either in the manger or on the floor, where it would either form ice or keep the floor wet and slippery, and, if of wood, would soon cause it to rot and decay.

I am aware that mangers have been constructed with feed-boxes to turn over; that a grain-box has been arranged to swing, so as to be used when down, and that water-troughs have been hung on journals under a hydrant, so they could be turned over to empty the surplus water, and therefore I do not claim either of these; but What I do claim is—

1. The water-trough D, pivoted by links $f$ at its ends, in combination with the notched or shouldered supports P, said parts being arranged to operate substantially as described, whereby said trough, when elevated, can be used for supplying cattle with water, and when swung down and turned over is made to form the outer side of the manger, as set forth.

2. In combination with the trough D, pivoted to links which are in turn pivoted at their opposite ends to the manger or framework, supports P, for retaining the trough with its open side up when elevated, and the water-pipe E, arranged to deliver water to the trough, substantially as described.

3. The pivoted and swinging trough D, provided with a spout or opening, I, in combination with a drain-pipe, H, the said parts being arranged substantially as shown, whereby when said trough is elevated it shall be in position to deliver its surplus water to the drain-pipe, as set forth.

4. The combination and arrangement, in connection with animal-stalls, of the pivoted and swinging trough D, the pipe F, for delivering water to the trough, and the drain-pipe H, for receiving and conducting the surplus water from the trough, as and for the purpose set forth.

CARVER REMINGTON.

Witnesses:
GEO. C. HUTCHINS,
FRED H. BERRETT.